No. 886,648. PATENTED MAY 5, 1908.
G. A. SCHOELLER.
APPARATUS FOR ADJUSTING ELEVATION OF GUNS.
APPLICATION FILED JAN. 7, 1907.

3 SHEETS—SHEET 1.

No. 886,648. PATENTED MAY 5, 1908.
G. A. SCHOELLER.
APPARATUS FOR ADJUSTING ELEVATION OF GUNS.
APPLICATION FILED JAN. 7, 1907.

3 SHEETS—SHEET 3.

UNITED STATES PATENT OFFICE.

GUSTAV A. SCHOELLER, OF MÜLHEIM-ON-THE-RUHR, GERMANY, ASSIGNOR TO FRIED. KRUPP AKTIENGESELLSCHAFT, OF ESSEN-ON-THE-RUHR, GERMANY.

APPARATUS FOR ADJUSTING ELEVATION OF GUNS.

No. 886,648.  Specification of Letters Patent.  Patented May 5, 1908.

Application filed January 7, 1907. Serial No. 351,236.

*To all whom it may concern:*

Be it known that I, GUSTAV A. SCHOELLER, a subject of the Emperor of Germany, and a resident of Mülheim-on-the-Ruhr, Germany, have invented certain new and useful Improvements in Apparatus for Adjusting Elevation of Guns, of which the following is a specification.

The present invention relates to a device for adjusting the elevation of guns, and more particularly a device such as described in the United States Letters Patent No. 639,407.

An object of the invention is to provide a construction giving a more exact adjustment of the elevation.

Figure 1:
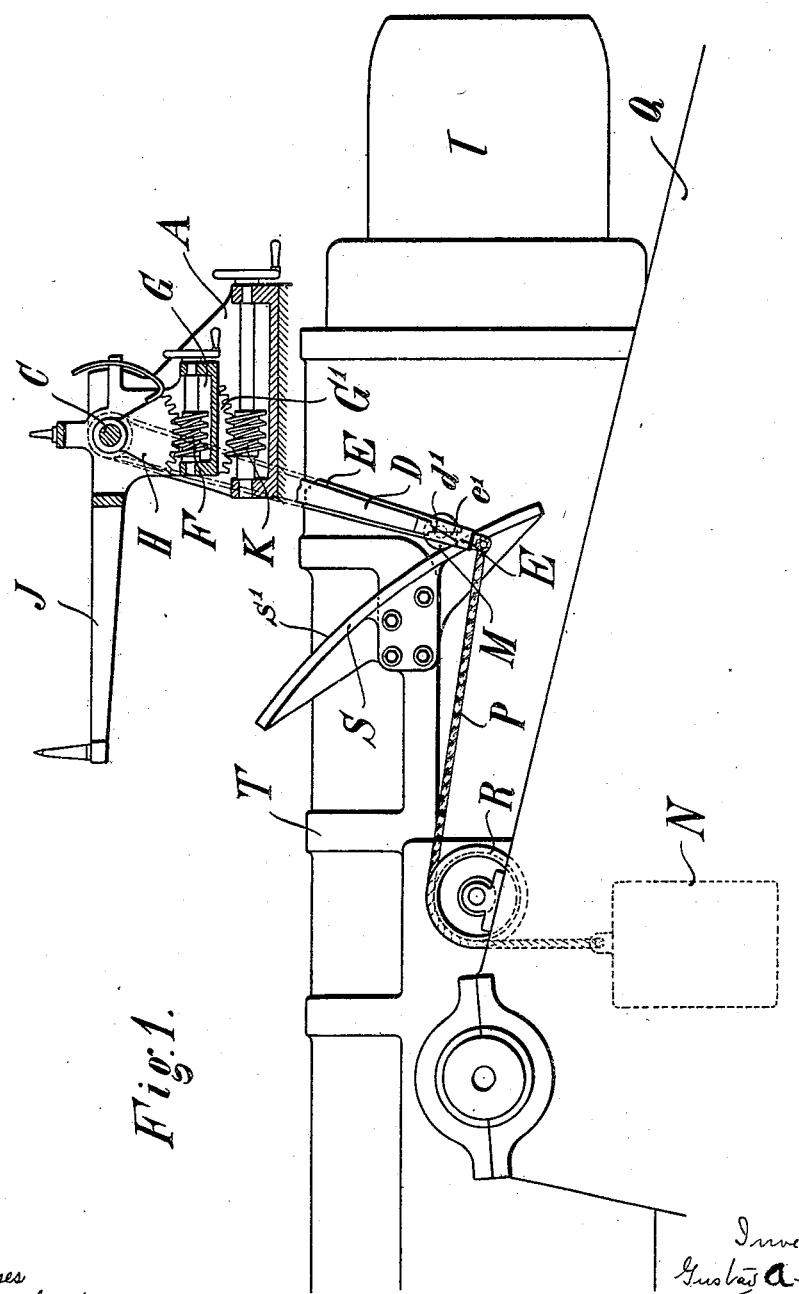
Figure 2:
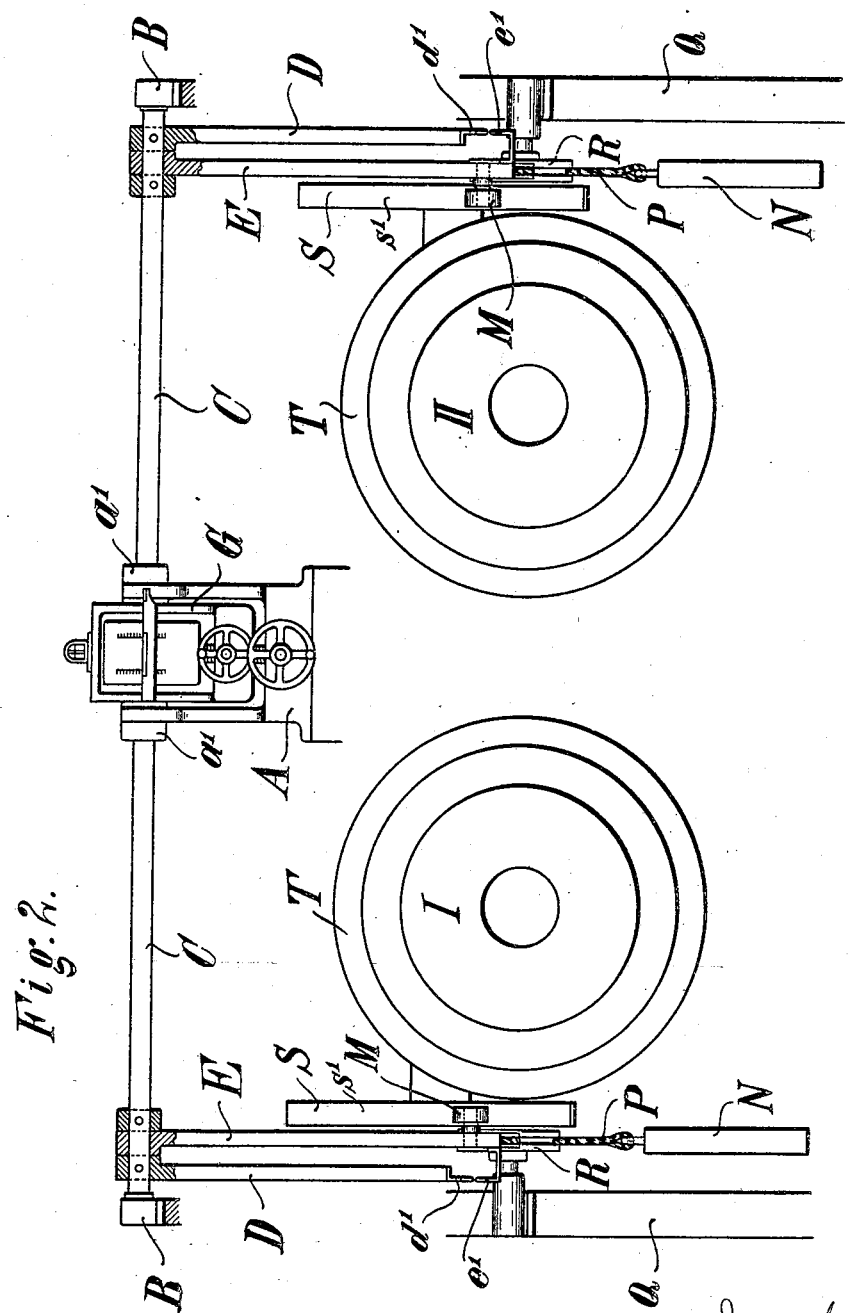
Figure 3:
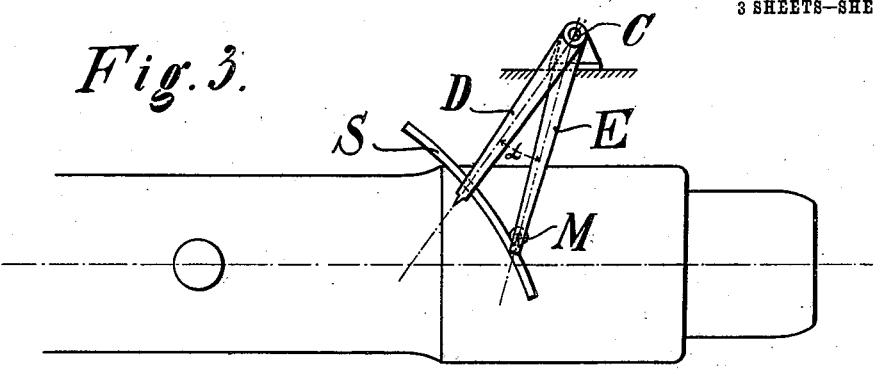
Figure 4:
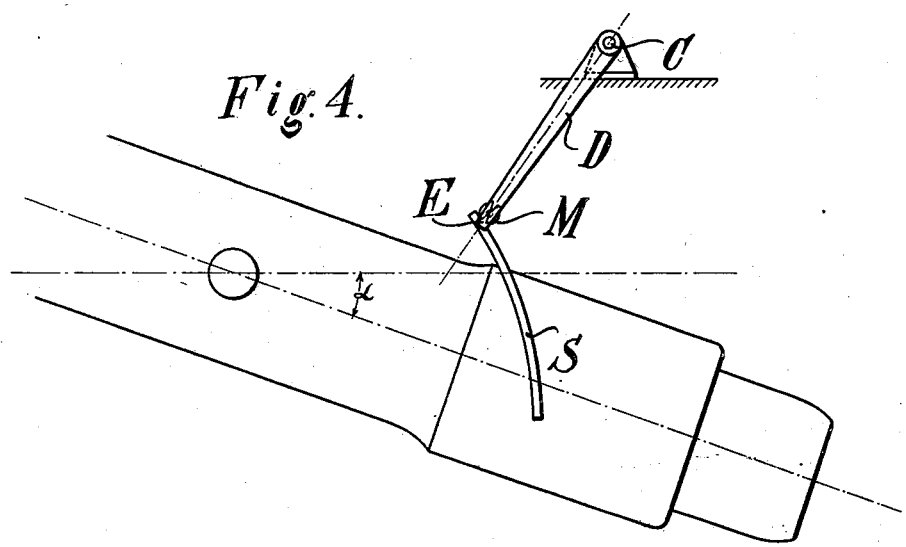
Figure 5:
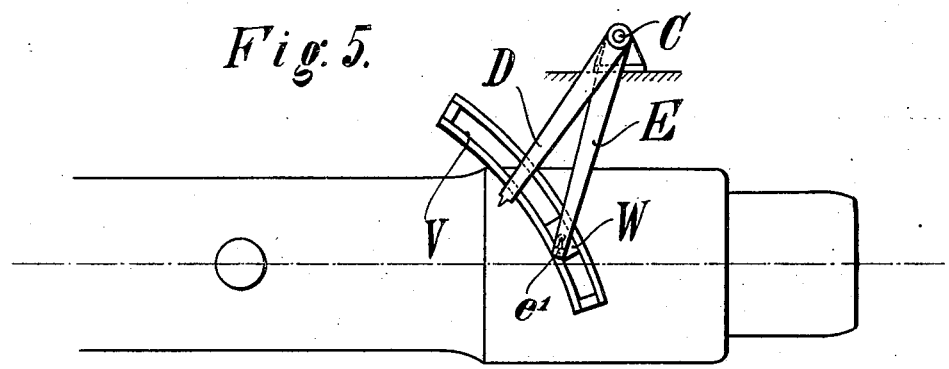

In the accompanying drawings: Figure 1 is a side view, partly in section, of one embodiment of the invention; Fig. 2 is a corresponding rear view; Figs. 3 and 4 are diagrammatic views; and Fig. 5 is a view corresponding to that shown in Fig. 3, but of a second embodiment of the invention.

Reference will first be had to the embodiment shown in Figs. 1 to 4. A standard A is located between the two guns I and II and is provided with bearings $a'$. A shaft C is rotatably mounted in the bearings $a'$ and in two fixed bearings B. Two index hands D are rigidly secured on the shaft C and can be adjusted to the elevation corresponding to the distance of the target through the medium of a worm F which engages with a worm-wheel sector H located on the shaft C. The worm F is journaled in a housing G which is integral with the sighting beam J and which is rotatably mounted on the shaft C. The sighting line can be directed at the target by means of a worm K journaled in the standard A and engaging with teeth $G'$ on the housing G.

The above-described arrangement is shown and described in Patent No. 639,407, before mentioned.

Adjacent to each of the index hands D, a second index hand E is rotatably but non-slidably arranged on the shaft C and each of these index-hands E is provided with a pointer $e'$ which is directed toward the shaft C. Near their free ends, the index hands E carry a roller M which has its axis of rotation parallel to the axis of the shaft C and by means of a weight N this roller is held in force closure engagement with the face $s'$ of a directing rail S secured to the cradle T of the gun-barrel. The counterweight N is suspended from a rope P secured to the index hand E and passing over a pulley R journaled in the wall Q of the mount.

As shown in Fig. 1, the face $s'$ of the rail S extends eccentric to the axis of the horizontal trunnions and the above-described arrangement of the index hand E therefore causes the hand E to swing about its own axis when the gun-barrel is elevated, the hand E swinging to the left from the position shown in Fig. 1, when the breech is lowered and to the right when the breech is elevated. The face $s'$ of the rail S is curved in such a manner, that, when the gun-barrel is elevated, a desired angle, the index hand E is adjusted the same angle. Therefore, when the gun-barrel is elevated the free end of the pointer $e'$ will describe a path relatively to the gun-barrel which extends according to the index-curve shown and described in Patent 639,407.

The mode of using the described device is consequently as follows: By turning the worm F the gunner first adjusts the index-hand D to the elevation corresponding to the distance of the target. Thereupon, he directs the sighting line at the target by turning the worm K. The index-hand D partakes of this adjustment of the sighting beam J and housing G and the position of the index-hand D has now shifted, for instance, the angle $\alpha$, Fig. 3, from its zero position. While the gunner in this way adjusts the sighting device or the index-hand D, the man serving the training mechanism of the gun tries to make the pointer $e'$ of the index-hand E register with the pointer $d'$ of the pointer D. He does this either by raising or by lowering the breech of the gun-barrel according to the direction the index-hand D is to move. When the index-hand D has come to rest and the gun-barrel has such a position that the pointers D, E, register with each other, the gun-barrel has exactly the elevation $\alpha$, Fig. 4, that corresponds to the distance and elevation of the target.

In the embodiment shown in Fig. 5, the rail is formed as a guide V for a slide W pivoted to the index-hand E. Also in this embodiment, when the gun-barrel is raised and lowered, the pointer $e'$ describes a path which extends according to the index-curve explained in the Patent No. 539,407.

The above-described arrangements provide for a more exact adjustment of the elevation of the gun than the device according to the Patent No. 639,407, for the reason that the eye can with more certainty detect an error in the relative position of two pointers than it can detect an error in the position of one index-hand relatively to a curve.

In the first-described embodiment, any error which might result from the setting up of the device can easily be compensated for either by re-dressing the surface $s'$ or by the substitution of a roller of smaller or greater diameter for the roller M. Further in this arrangement dead movement between the rail S and the index-hand E is avoided because the latter is held in force closure engagement with the rail S.

Without departing from the scope of the invention I might replace the weight N in the device according to Figs. 1 to 4, by a spring having one end engaging the index-hand E and having its other end engaging the mount.

Having now described my invention, what I claim and desire to secure by Letters Patent is:

1. The combination with a sighting device and an index hand mounted independently of the gun barrel and connected to the sighting device, of a track moving with the gun barrel, and a second index hand mounted independently of the gun barrel and moving on the track.

2. The combination of a pair of registering index hands mounted independently of the gun barrel upon the same axis and a track moving with the gun barrel and on which one of said hands travels.

3. The combination of a pair of registering index hands mounted independently of the gun barrel upon the same axis, a track moving with the gun barrel and on which one of said hands travels, and means holding the said hand in force closure engagement to the track.

4. The combination of a pair of registering index hands mounted independently of the gun, means for adjusting one of said hands independently of the other, a track moving with the gun barrel, and means holding the other hand to said track.

5. The combination with a sighting device and an index hand mounted independently of the gun barrel and connected to the sighting device, of a track moving with the gun barrel and having a curved guide-surface, a second index hand mounted independently of the gun barrel, means for adjusting said first named index hand independently of the other index hand, and means holding said other hand on the guide surface of said track to cause movement to be transmitted from the gun-barrel to the hand.

The foregoing specification signed at Dusseldorf, Germany, this 8th day of October, 1906.

GUSTAV A. SCHOELLER.

In presence of—
ALFRED POHLMEYER,
PETER LIEBER.